United States Patent
Hsu et al.

(10) Patent No.: US 6,549,969 B1
(45) Date of Patent: Apr. 15, 2003

(54) INTERLOCK FOR PREVENTING HUMAN ERROR IN HOT PLUGGABLE SYSTEMS

(75) Inventors: Windsor Wee Sun Hsu, Sunnyvale, CA (US); Stephen Paul Morgan, San Jose, CA (US); Shauchi Ong, San Jose, CA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/515,371

(22) Filed: Feb. 29, 2000

(51) Int. Cl.⁷ .............................................. G06F 13/00
(52) U.S. Cl. ........................ 710/304; 710/302; 361/193; 310/325
(58) Field of Search ........................ 711/114; 361/685, 361/796, 684, 686, 683; 292/201, 216, 144, 174; 710/10, 74, 301

(56) References Cited

U.S. PATENT DOCUMENTS

| | | | | |
|---|---|---|---|---|
| 4,784,415 A | * | 11/1988 | Malaval ....................... 292/144 |
| 5,185,881 A | | 2/1993 | Brooks et al. .............. 395/575 |
| 5,359,492 A | * | 10/1994 | Porter ........................... 292/85 |
| 5,379,184 A | * | 1/1995 | Barraza et al. ............... 16/438 |
| 5,572,141 A | | 11/1996 | Hutton ........................ 324/757 |
| 5,784,644 A | * | 7/1998 | Larabell ...................... 710/14 |
| 5,812,370 A | * | 9/1998 | Moore et al. ............... 361/684 |
| 5,822,547 A | | 10/1998 | Boesch et al. .............. 395/283 |
| 5,875,308 A | | 2/1999 | Egan et al. .................. 395/283 |
| 6,076,142 A | * | 6/2000 | Corrington et al. ......... 710/306 |
| 6,098,119 A | * | 8/2000 | Surugucchi et al. .......... 710/10 |
| 6,311,242 B1 | * | 10/2001 | Falkenburg et al. ........ 710/301 |
| 6,325,353 B1 | * | 12/2001 | Jiang ........................... 248/682 |
| 6,386,599 B1 | * | 5/2002 | Chevalier .................... 292/201 |
| 6,460,099 B1 | * | 10/2002 | Stryker et al. ................ 710/74 |

FOREIGN PATENT DOCUMENTS

EP   92300101.0   1/1992   ............ H04N/7/14

OTHER PUBLICATIONS

Publication: "Hot Plug Receptacle Actuated Mechanical Latch". IBM Technical Disclosure Bulletin. vol. 34, No. 6, pp. 363–364. Nov. 1991.
Publication: "Automatic Protection Against Erroneous Modem Card Plugging". IBM Technical Disclosure Bulletin. vol. 31, No. 10, pp. 367–368. Mar. 1989.
Publication: "Ultra–Bay ÚÚ Eject/Lock Mechanism". IBM Technical Disclosure Bulletin. vol. 40, No. 12, pp. 215–216. Dec. 1997.
Publication: "Concurrent Maintenance Direct Access Storage Device for Computer Systems". IBM Technical Disclosure Bulletin. vol. 37, No. 04B, pp. 391–399. Apr. 1994.
Publication: "Direct Access Storage Device (DASD) Concurrent Maintenance". IBM Technical Disclosure Bulletin. vol. 33, No. 8, pp. 223–227. Jan. 1991.

* cited by examiner

Primary Examiner—Sumati Lefkowitz
Assistant Examiner—Christopher E. Lee
(74) Attorney, Agent, or Firm—John L. Rogitz (57) ABSTRACT

A hot pluggable system includes an interlock between a component fail detect module and a component lock mechanism, such that the component is locked in place when it operates properly and is automatically released to permit a person to remove the component from the system when the component fails. In this way, the risk of human errors in removing the wrong component is reduced.

25 Claims, 7 Drawing Sheets

INTERLOCK FOR PREVENTING HUMAN ERROR IN HOT PLUGGABLE SYSTEMS

BACKGROUND OF THE INVENTION

1. Field of the Invention

The present invention relates to preventing human errors while disengaging components from hot pluggable systems while the systems are operational.

2. Description of the Related Art

Hot pluggable computer systems are computer systems in which components can be removed, e.g., for repair, and then reinstalled, all while the remainder of the system remains operational. As an example, a computer system might include several disk drives, any one of which can fail. With hot pluggable technology, the failed disk drive can be removed from the system without having to deenergize the system or otherwise make it unavailable. Likewise, a disk drive can be added to a hot pluggable system while the system is operational. Together with redundancies afforded by, e.g., RAID technology, hot pluggable technology promotes high system availability.

Accordingly, hot pluggable systems are designed to support non-stop operation. Typically, hot pluggable systems include row after row of virtually identical components, and lights next to each component are illuminated as appropriate to indicate whether the component is functional or whether it has failed or otherwise requires maintenance. Or, a computer display might be used to indicate the status of each component. Or yet again, all system components might be locked in place, requiring a system administrator to unlock a component to permit its removal. In all cases, as recognized by the present invention, current systems rely on a person to correctly disengage and/or remove failed components, and, despite the indications that are available, it happens that human error in removing properly functioning components instead of failed components are the main cause for hot pluggable systems becoming unintentionally unavailable. The present invention makes the critical observation that what is missing in the prior art is an automatic interlock between the logic that detects a failure in a hot pluggable component and the logic that locks the hot pluggable component in place.

SUMMARY OF THE INVENTION

A hot pluggable computer system includes a hot pluggable component that in turn includes a housing. A component bay is configured for receiving the component therein, with the component being positionable in an operate position in the bay in which the component is accessible to other parts of the system. Also, a failure detect module is associated with the component to generate a fail signal if the component malfunctions. Moreover, a lock is associated with the bay, and the lock is movable between a "lock" position, wherein the lock engages the housing to hold the component in the bay when the component is in the operate position, and a release position, wherein the lock is distanced from the housing and the component can be moved from the operate position. In accordance with the disclosure below, the lock is automatically moved to the release position in response to the fail signal and/or inputs from a user or system administrator.

In a first embodiment, the lock is spring-biased toward the lock position. The lock has an incline surface, such that as the component is being installed, the component rides against the incline surface to urge the lock toward the release position when the component is moved toward the operate position. In this embodiment, an electromagnet is associated with the lock and is selectively energizable to move the lock. Also, an interlock module is electrically coupled to the electromagnet to actuate the electromagnet upon receipt of the fail signal. If desired, the fail detect module can be unitary with the interlock module. A mechanical release can be coupled to the lock to move the lock to the release position regardless of whether a fail signal is present.

In a second embodiment, the lock includes at least one bolt pivotably mounted in the bay. The bolt is coupled to a motor, and the motor moves the bolt between the lock position and the release position. The preferred bolt is a variable length bolt that is biased toward an extended configuration, wherein at least a distal segment of the bolt can protrude into a cavity of the housing of the hot pluggable component, and a retracted configuration, wherein the distal segment abuts the housing when the cavity is not properly aligned with the bolt. In a specific embodiment, the bolt includes a proximal segment and a sleeve reciprocatingly engaged with the proximal segment, with the sleeve defining at least a portion of the distal segment of the bolt.

In another aspect, a computer-implemented method is disclosed for unlocking a hot pluggable component from an associated system device. The method includes locking the hot pluggable component, and then receiving a signal representative of a malfunction of the component. In response to the signal, the component is automatically unlocked.

In still another aspect, a computer program device includes a computer program storage device that is readable by a digital processing apparatus. A program is on the program storage device, and the program includes instructions that are executable by the digital processing apparatus for interlocking, with a fail signal representing a malfunction of a component, the release of the component from a system device. The program includes computer readable code means for receiving the fail signal. Also, the program includes computer readable code means for actuating a lock mechanism associated with the component to permit the component to be manually removed from the system device in response to the fail signal.

In yet another aspect, a hot pluggable system includes a system device including a lock mechanism, and a hot pluggable component can be engaged with the lock mechanism when the component is appropriately positioned to permit communication between the component and devices in the system other than the system device. The system further includes a fail detect module that is coupled to the component to detect malfunctions thereof and to generate fail signals in response thereto. An interlock module is coupled to the fail detect module and to the lock mechanism to automatically actuate the lock mechanism if a fail signal is received. The interlock module can receive control input from a system administrator. It will be appreciated that the modules cooperate to establish an interlock between fail detection and component locking.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
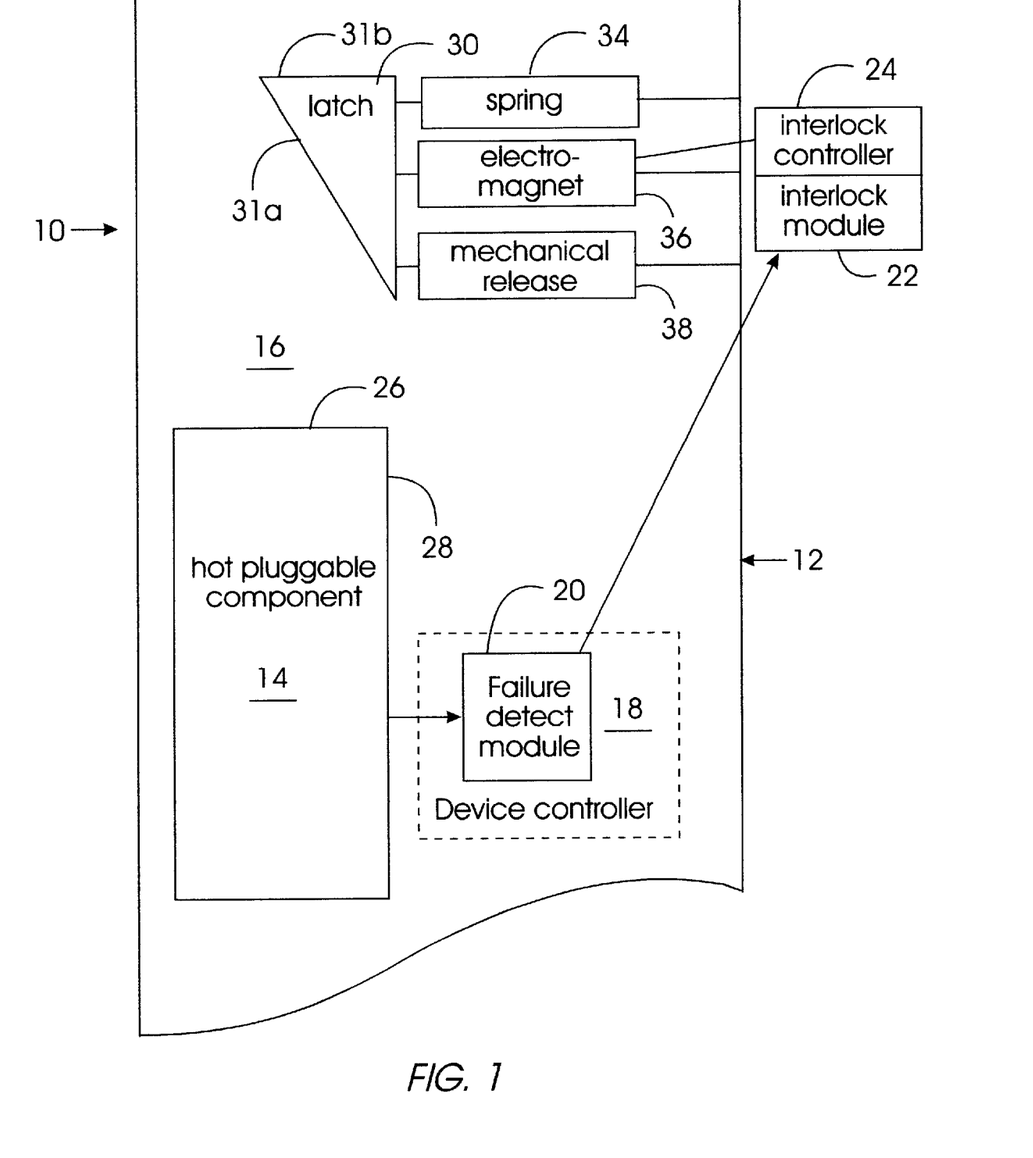
FIG. 1 is a schematic diagram of a first embodiment of the present system, showing a hot pluggable component distanced from a lock in a component bay and the lock in the lock position.

Referring initially to FIG. 1, a hot pluggable system 10 is shown that includes plural system devices 12 (only a single device 12 shown for clarity of disclosure) each of which can be associated with one or more hot pluggable components 14. By way of illustration, a system device 12 might be a disk drive device having one or more drive bays 16 into which the hot pluggable component 14 can be advanced to an operate position in the bay in which communication is permitted between the component 14 and other devices of the system 10, such as other drive devices, other computers, controllers, and so forth. In this illustration, the component 14 itself can be a disk drive. It is to be understood, however, that the present invention broadly applies to other hot pluggable systems and components, with the commonality being that by "hot pluggable" is meant that components 14 can be removed from their associated devices 12 and reinstalled therein, without removing the system 10 from operation.

As shown in FIG. 1, the system device 12 can include a device controller 18 that executes, among other things, a software-implemented fail detect module 20. The fail detect module 20 is coupled to the component 14 to generate a fail signal in the event of a component 14 malfunction. As also shown, the fail detect module 20 is coupled to a software-implemented interlock module 22 that can be executed by an interlock controller 24 to function in accordance with the disclosure below. It is to be understood that while separate controllers 18, 24 are shown, the functions of the controllers 18, 24 can alternately be implemented by a single controller. Likewise, while separate modules 20, 22 are shown, their functions could be combined in a single software module if desired.

In one embodiment, the hot pluggable component 14 includes a metal or plastic housing 26 that defines at least one opening 28. Other engagement structure, such as cavities, ramps, ribs, flanges, and the like can be used if desired. When an opening 28 is used, a component lock mechanism 29 of the system device 12 includes at least one lock 30 that is movably mounted in the bay between a lock position (FIGS. 1 and 3), wherein the lock 30 is advanced inwardly toward the bay 16, and a release position (FIG. 4), wherein the lock is moved outwardly relative to the bay 16. In the first embodiment shown, the lock 30 is reciprocably mounted in the system device 12. Other engagement structure, such as pivoting leaf springs, detents, and the like can be used, provided they are controlled in accordance with the disclosure below. Indeed, in a less preferred embodiment the moving part of the lock mechanism of the present invention can be located on the component 14 and the non-moving part located on the system device 12, if desired.

Figure 3:
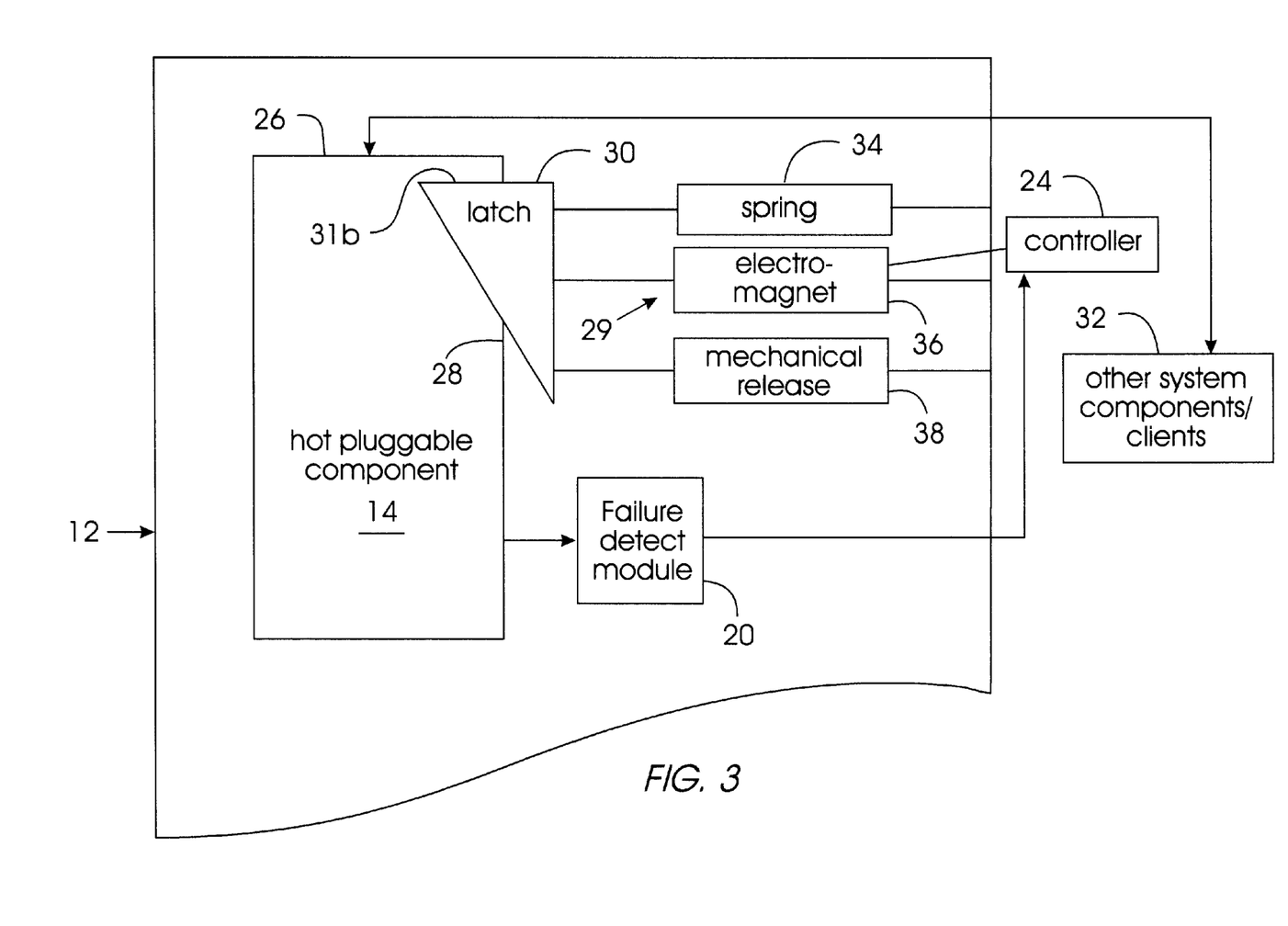
FIG. 3 is a schematic diagram of the first embodiment, showing the hot pluggable component in the operate position in the component bay and the lock in the lock position to lock the component in place.

It will be appreciated in brief reference to FIG. 3 that when the component 14 is both active and in the operate position to communicate with other system components/clients 32, the lock 30 is disposed in the opening 28 to engage the housing 26 of the component 14 to hold the component 14 in the bay 16. By "active" is meant that the component 14 is not only available (i.e., is in the operate position) but is also, when appropriate, properly configured, as is the case for, e.g., disk drives. Accordingly, a new unconfigured disk drive can be engaged with the bay 16 but will not be locked until it is determined that the drive has been properly configured for operation and, hence, is "active". In this way, should a person mistakenly insert the wrong new disk drive into a bay, the person can extract the disk drive prior to configuration without having to override the present interlock.

Figure 4:
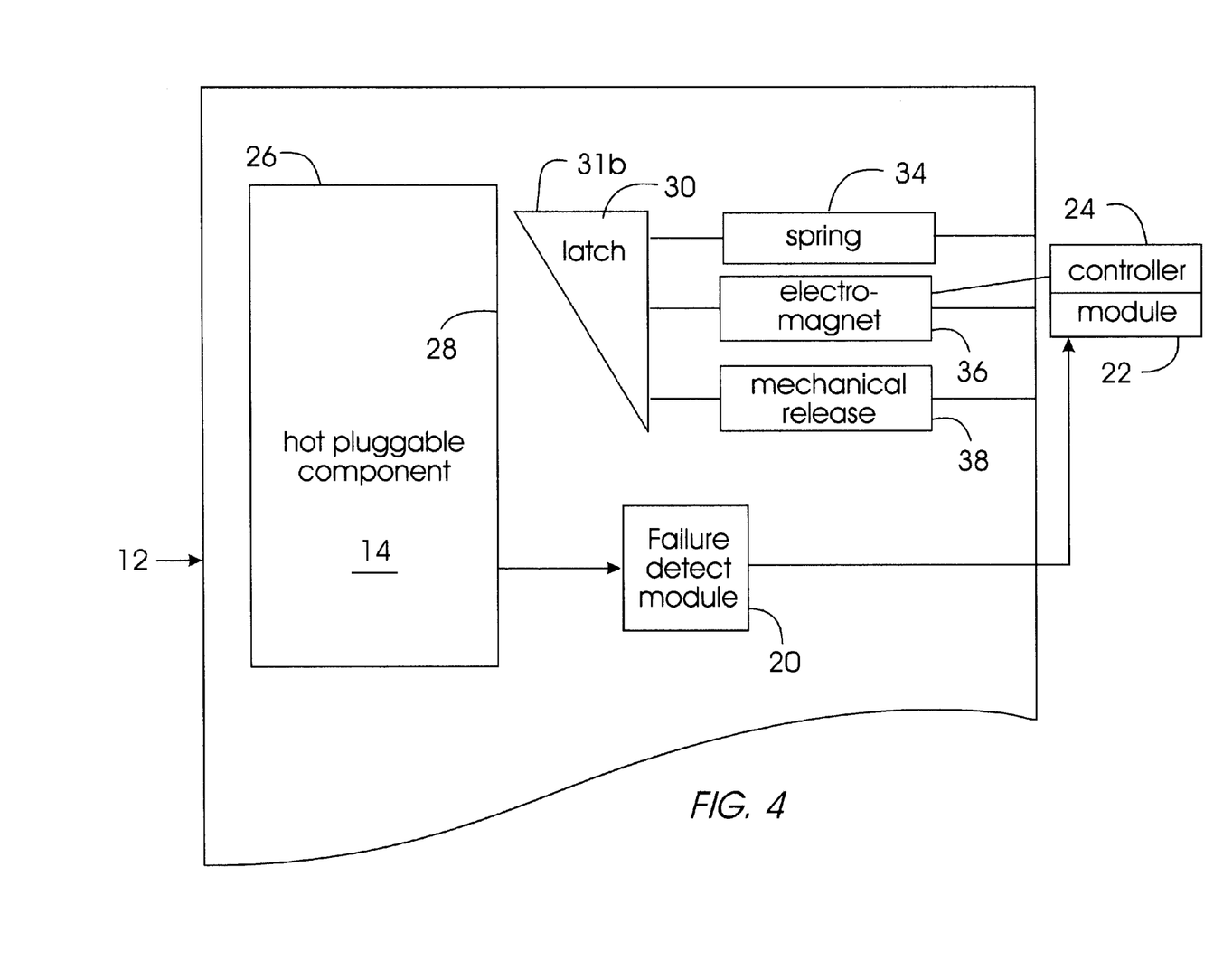
FIG. 4 is a schematic diagram of the first embodiment, showing the hot pluggable component in the operate position in the component bay with the lock in the release position to permit the component to be removed from the component bay.

As shown in FIG. 4, the lock 30 can be moved to the release position, in which the lock 30 is distanced from the opening 28 and the component 14 can be removed from the system device 12.

Referring back to FIG. 1 to complete the description of one embodiment of the present invention, the lock 30 preferably has an incline surface 31a and a normal surface 31b for purposes to be shortly disclosed. The lock 30 is biased toward the lock position by a spring 34. The lock 30 can be moved toward the release position against the compression force of the spring 34 by an electromagnet 36 in accordance with the logic described below. As shown, the electromagnet 36 is connected to the interlock controller 24. In one embodiment, the electromagnet 36 is actuated to move the lock 30 toward the release position by energizing the electromagnet 36. That is, in one embodiment the electromagnet is normally deenergized. In other embodiments, the electromagnet 36 can be actuated to move the lock 30 toward the release position by deenergizing the electromagnet 36, i.e., the electromagnet 36 can be normally energized. In any case, it is to be understood that the electromagnet can have any one of a plurality of physical implementations, including as, e.g., a solenoid and/or plunger. If desired, a mechanical release 38 such as a lever or plunger or other appropriate device can be coupled to the lock 30 to move the lock 30 to the release position regardless of whether the below-described fail signal is present.

Figure 2:
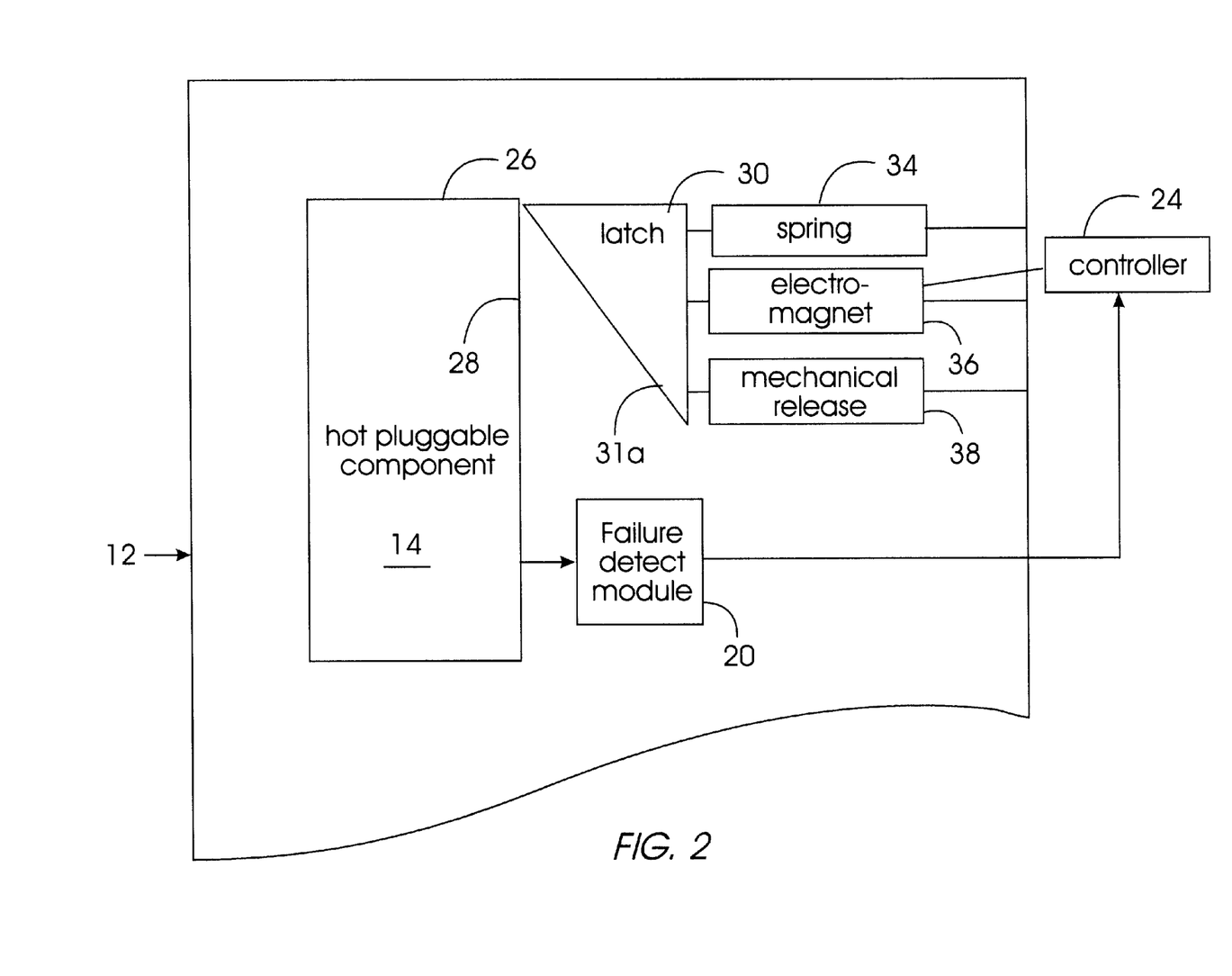
FIG. 2 is a schematic diagram of the first embodiment, showing the hot pluggable component advanced almost to the operate position in the component bay, riding against the lock.

With the above structure in mind, the operation of the system 10 in accordance with the logic embodied by the modules 20, 22 can now be appreciated. The component 14 can be advanced into the bay 16 as shown in FIG. 1. As further shown in FIG. 2, if the component is already properly configured for operation, as the component 14 is advanced into the bay 16, the component 14 rides against the incline surface 31a of the lock 30 to urge the lock 30 toward the release position. When the component 14 is in the operate position shown in FIG. 3, the lock 30 clears the opening 28 and, under the force of the spring 34, the lock 30 is moved to the lock position, wherein the normal surface 31b of the lock 30 engages the housing 26 of the component 14 along the front edge of the opening 28 to prevent the removal of the component 14 from the operate position. The component 14 can then be accessed by the other system components 32 (FIG. 3). On the other hand, if the component 14 is a component that requires configuring once installed to render the component active, the electromagnet 36 is energized during installation and thus the lock 30 is maintained in the release position once the component 14 is advanced to the operate position.

Figure 5:
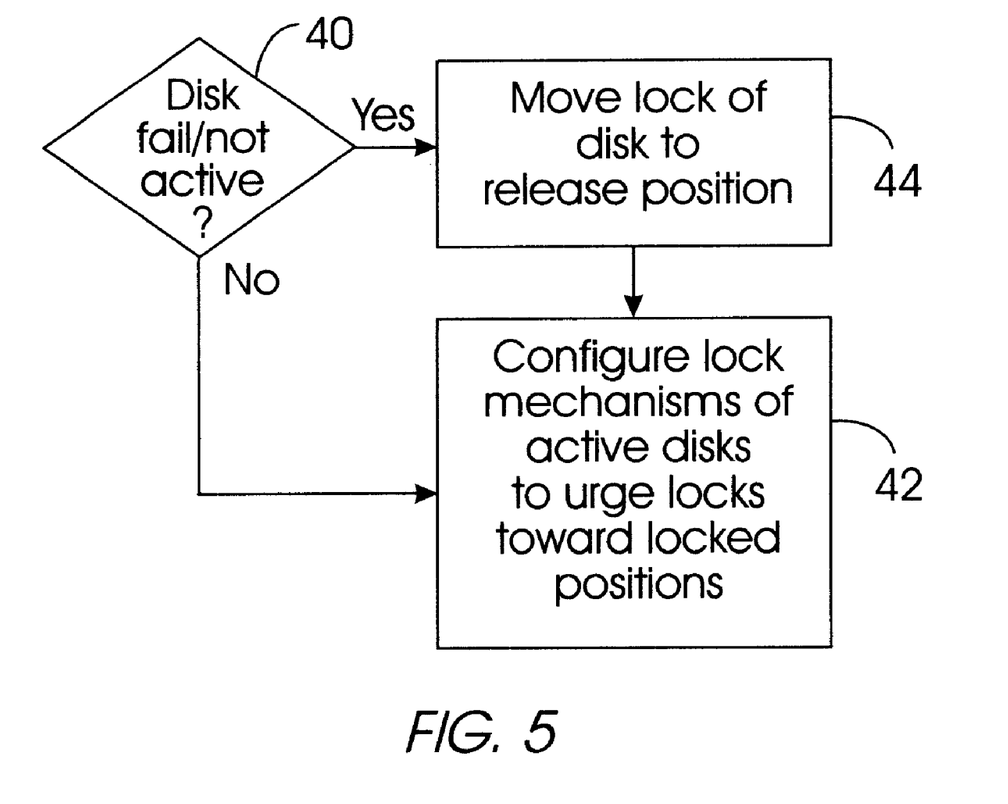
FIG. 5 is a flow chart showing the logic used with the embodiment shown in FIGS. 1–3.

Referring to FIGS. 3–5, as indicated at decision diamond 40 in FIG. 5 the interlock module 22 determines whether a fail signal is present from the fail detect module 20 (or whether a component 14 is not yet active). If no fail signal is present (assuming all components are active), the logic moves to block 42, wherein the lock mechanisms of active (i.e., properly configured) components 14 are configured to urge the respective locks 30 toward their lock positions. In the context of the above-described embodiment, the electromagnets 36 associated with active, properly functioning components 14 are deenergized to lock the components into their respective system devices. It is to be understood that preferably, a user such as a system administrator can also input control signals to the interlock module 22 to lock or unlock, as desired, components 14.

On the other hand, when a fail signal is received by the interlock module 22 (or for components 14 that are not yet active), the logic flows from decision diamond 40 to block 44, wherein the lock 30 of the malfunctioning (or inactive) component 14 is moved to or maintained in, as the case may be, the release position to permit a person to remove the component 14 from the system device 12. In the context of the above-described embodiment, the electromagnet 36 associated with the failed/inactive component 14 is energized at block 44 to unlock the component 14. The logic also maintains the active components 14 locked in place at block 42. It is to be understood that while the present logic is presented in flow chart format for ease of disclosure, the present invention can be implemented by state logic, in which all components 14 are locked until a fail signal is received, upon which the state of the system changes to unlock the malfunctioning component.

The controllers 18, 24 can be implemented by a digital processing apparatus, such as a hot pluggable component controller. Any computer, however, can undertake the logic of the present invention, including, for instance, a personal computer or laptop computer made by International Business Machines Corporation (IBM) of Armonk, N.Y. Moreover, the modules 20, 22 can be executed by a processor within the respective controller as a series of computer-executable instructions. These instructions may reside, for example, in RAM of the controller.

Alternatively, the instructions may be contained on a data storage device with a computer readable medium, such as a computer diskette. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code.

Figure 6:
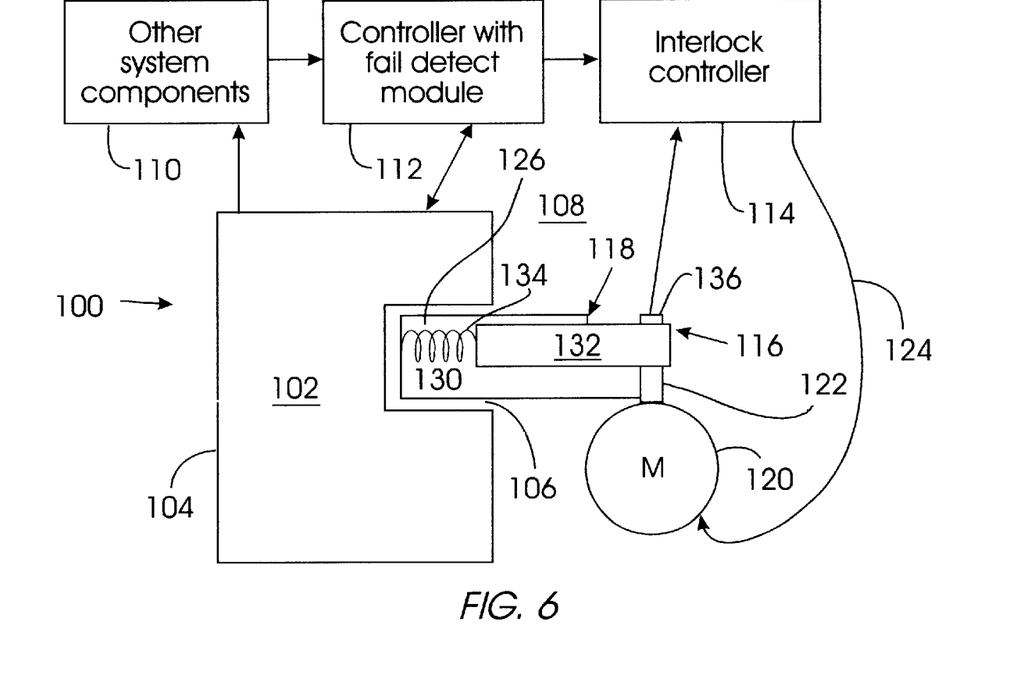
FIG. 6 is a schematic diagram of a second embodiment of the present system, showing a hot pluggable component and a locking bolt in the lock position.
Figure 7:
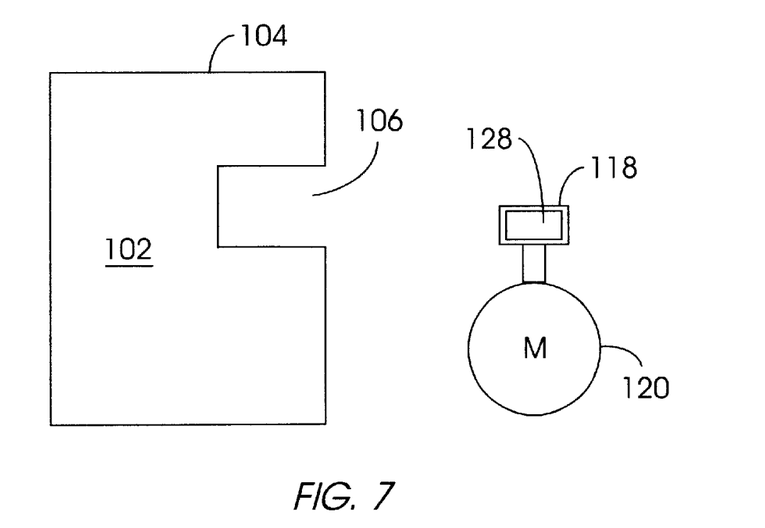
FIG. 7 is a schematic diagram of the second embodiment, showing the locking bolt rotated to the release position.

FIGS. 6–9 illustrate a second, presently preferred system of the present invention, generally designated 100. As shown in FIG. 6, a hot pluggable component 102 includes a housing 104 formed with at least one cavity 106. It is to be understood that the component 102 is in all essential respects identical to the component 14 shown in FIG. 1, and that the component 102 shown in FIG. 6 consequently is slidably engaged with a bay 108 of a system device to establish communication between the component 102 and other system components 110. Also, as was the case with the previous embodiment a controller with fail detect logic 112 communicates with the component 102 and, if desired, with other system components 110 to provide a fail signal when a hot pluggable component fails. This signal is sent to an interlock controller 114 that functions in accordance with disclosure below to lock and release the component 102 in the bay 108.

The system 100 includes a lock mechanism, generally designated 116, that includes a bolt 118 which preferably is pivotably mounted in the bay 108. It is to be understood that the term "bolt" as used herein refers to any movable hard shaft, rod, or other elongated structure that can function in accordance with the disclosure herein. As shown, the bolt 118 is coupled to an electric AC or DC motor 120 via, e.g., a shaft 122, with the electric motor 120 being selectively energizable by the interlock controller 114 as indicated by the line 124. The motor 120 is normally deenergized. As disclosed further below, however, the motor 120 can be energized to move the bolt 118 between a lock position shown in FIG. 6, wherein at least a distal segment 126 of the bolt 118 protrudes into the cavity 106 of the hot pluggable component 102 to lock the component 102 into the bay 108, and a release position shown in FIG. 7, wherein the bolt 118 has been pivoted in a plane that is normal to the two dimensions shown in FIG. 7, such that a distal-most end 128 of the bolt 118 appears in plan view in FIG. 7 and such that the distal segment 126 is distanced from the cavity 106 to permit the hot pluggable component 102 to be removed from the bay 108.

Figure 8:
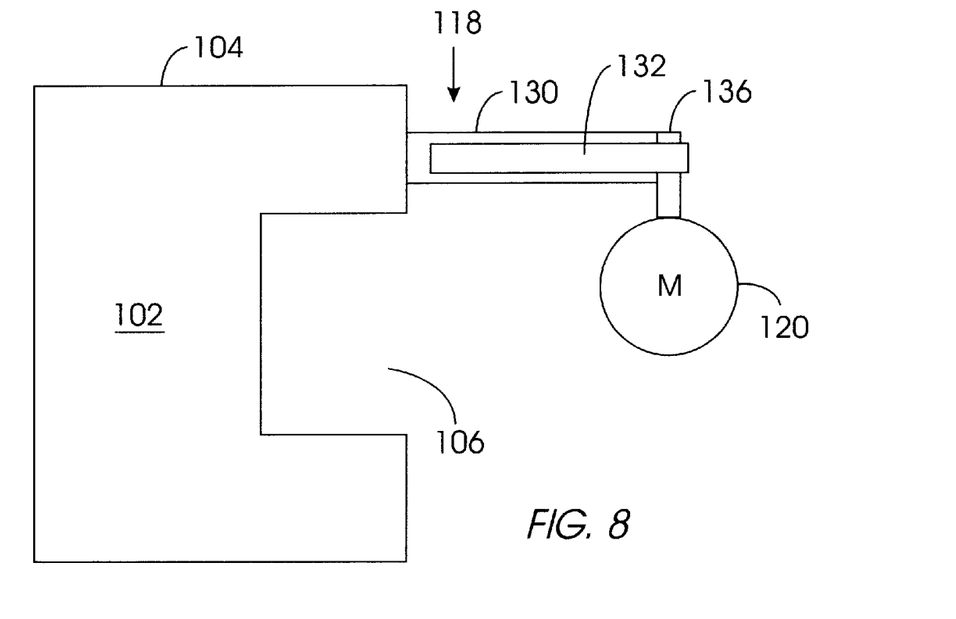
FIG. 8 is a schematic diagram of the second embodiment, showing the hot pluggable component in an improperly inserted position and the locking bolt consequently in the retracted configuration.

Preferably, the bolt 118 is a variable length bolt. In the preferred implementation shown, the distal segment 126 is established by a rigid hollow sleeve 130 that can reciprocate around a rigid proximal segment 132. A spring 134 is held in compression between the sleeve 130 and proximal segment 132 to bias the bolt 118 toward an extended configuration shown in FIG. 6, wherein at least the distal segment 126 of the bolt 118 can protrude into the cavity 106. Also, in the event that the bolt 118 is moved toward the lock position without the component 102 being properly aligned in the bay 108, i.e., as shown in FIG. 8, the sleeve 130 rides against the housing 104 of the component 102 to move the bolt 118 to a retracted configuration, wherein the sleeve 130 abuts the housing 104. It is to be understood that the angle of ride of the sleeve 130 against the housing 104 under such circumstances is such to facilitate movement of the sleeve 130 proximally along the proximal segment 132 of the bolt 118. In addition or in lieu of the angle between the bolt 118 and component 102, the distal end 128 of the bolt 118 can be chamfered to further facilitate the smooth riding of the sleeve 130 along the housing 104 in the event of misalignment. In any case, a sensor such as a contact sensor 136 can be provided on the bolt 118 to sense contact with the sleeve 130 when the bolt 118 is in the retracted configuration. The sensor 136 can generate a signal representative of this fact and send the signal to the interlock controller 114 to cause the controller 114 to deenergize or reverse the motor 120.

Figure 9:
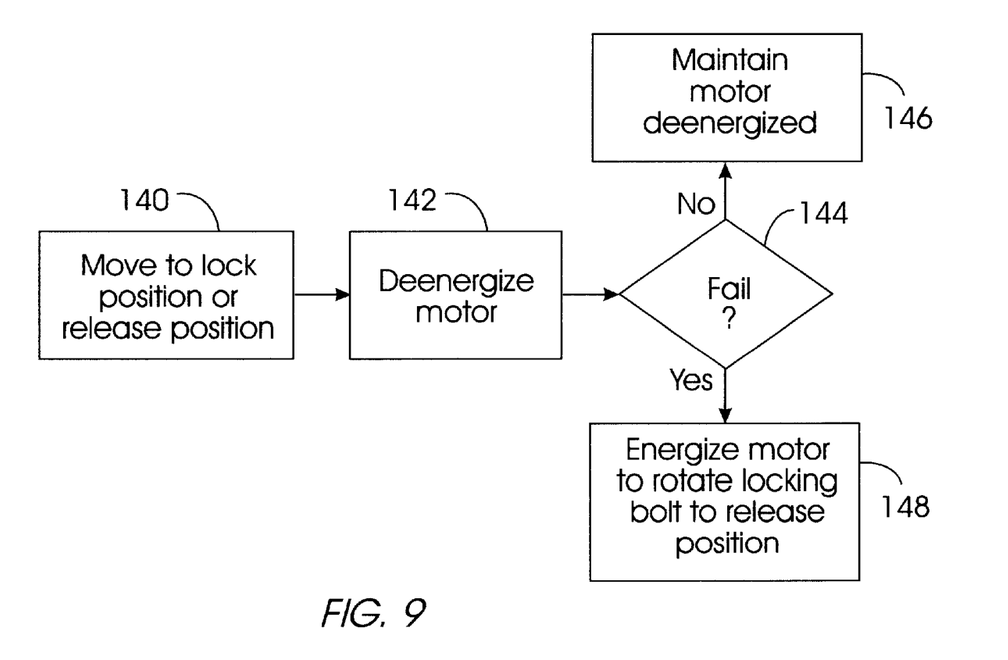
FIG. 9 is a flow chart of alternate interlock logic.

The logic of the interlock controller 114 can be seen in reference to FIG. 9. As indicated at block 140, when the component 102 is properly engaged with the bay 108 and is configured for use, a signal representative of such can be sent to the controller 114 to cause the motor 120 to be energized to move the bolt 118 to the lock position. Or, the system administrator can cause the controller 114 to lock or release the component 102 when and if desired. Once the locking mechanism has been moved to the desired position, the motor 120 is deenergized at block 142.

Assuming that a component 102 has been properly installed and locked in place as shown in FIG. 6, the logic can receive a fail signal from the controller with fail detect module 112. This is represented, for illustration purposes, by decision diamond 144 in FIG. 9. When no fail signal is present the motor 120 remains deenergized at state 146, but when a fail signal is generated that pertains to the component 102, the logic moves to block 148 to energize the motor 120 to pivot the bolt 118 to the release position shown in FIG. 7. A maintenance technician can then remove the component 102 from the bay 108 without risking moving a properly functioning component, all of which remain locked in their respective bays.

While the particular INTERLOCK FOR PREVENTING HUMAN ERROR IN HOT-PLUGGABLE SYSTEMS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A hot pluggable system, comprising:
    at least one hot pluggable component including a housing;
    at least one component bay configured for receiving the component therein, the component being positionable in an operate position in the bay;
    at least one failure detect module associated with the component and generating a fail signal at least if the component malfunctions;
    at least one lock associated with the bay and movable between a lock position, wherein the lock engages the housing to hold the component in the bay, and a release position, wherein the lock is distanced from the housing and the component can be moved from the operate position, the lock being automatically moved to the release position in response to the fail signal, the lock being automatically moved to the lock position only when the component is both active and functional, the component being at least one hard disk drive that is active and functional only when it is properly configured for operation in a system having plural disk drives.

2. The system of claim 1, wherein the lock is biased toward the lock position.

3. The system of claim 2, wherein the lock is spring-biased toward the lock position.

4. The system of claim 2, wherein the lock has an incline surface, such that the component rides against the incline surface to urge the lock toward the release position when the component is moved toward the operate position.

5. The system of claim 2, wherein the lock is reciprocally mounted with respect to the bay.

6. The system of claim 1, further comprising:
    at least one electromagnet associated with the lock and selectively energizable to move the lock; and
    at least one interlock module electrically coupled to the electromagnet to actuate the electromagnet upon receipt of the fail signal.

7. The system of claim 6, wherein the fail detect module is unitary with the interlock module.

8. The system of claim 6, further comprising a mechanical release coupled to the lock to move the lock to the release position regardless of whether a fail signal is present.

9. The system of claim 1, wherein the lock includes at least one bolt movably mounted in the bay, the bolt being coupled to a motor, the motor moving the bolt between the lock position and the release position.

10. The system of claim 9, wherein the bolt is pivotably mounted in the bay, and the bolt is biased toward an extended configuration, wherein at least a distal segment of the bolt can protrude into a cavity of the housing of the hot pluggable component, and a retracted configuration, wherein the distal segment abuts the housing when the cavity is not properly aligned with the bolt.

11. The system of claim 10, wherein the bolt includes a proximal segment and a sleeve reciprocatingly engaged with the proximal segment, the sleeve defining at least a portion of the distal segment of the bolt.

12. A computer-implemented method for unlocking a hot pluggable component from an associated system device, comprising:
    locking the hot pluggable component into the system device only if the component is both active and functional, the component being at least one hard disk drive that is active and functional only when it is properly configured for operation in a system having plural disk drives;
    receiving a signal representative of a malfunction of the component; and
    in response to the signal, automatically unlocking the component from the system device.

13. The method of claim 12, further comprising providing at least one electromagnet associated with the component and providing at least one interlock module electrically coupled to the electromagnet to unlock the component upon receipt of the signal.

14. The method of claim 13, further comprising providing a mechanical release coupled to the component to unlock the component regardless of whether the signal is present.

15. The method of claim 12, further comprising providing at least one bolt movably mounted in the system device, the bolt being coupled to a motor, the motor moving the bolt between the lock position and the release position.

16. The method of claim 15, wherein the bolt is pivotably mounted in the device, and the bolt is biased toward an extended configuration, wherein at least a distal segment of the bolt can protrude into a cavity of the hot pluggable component, and a retracted configuration, wherein the distal segment abuts a housing of the hot pluggable component when the cavity is not properly aligned with the bolt.

17. The method of claim 12, further comprising receiving a signal from a system administrator to lock or unlock the component from the system device.

18. The method of claim 12, further comprising receiving a signal representative of the hot pluggable component being configured and ready for use and in response thereto locking the component in the system device.

19. The method of claim 18, further comprising receiving a signal from a system administrator to lock or unlock the component from the system device.

20. A hot pluggable system, comprising:
- at least one system device including at least one lock mechanism;
- at least one hot pluggable component automatically engageable with the lock mechanism only if the component is active, the component being at least one hard disk drive that is active only when it is properly configured for operation;
- at least one fail detect module coupled to the component to detect malfunctions thereof and to generate fail signals in response thereto; and
- at least one interlock module coupled to the fail detect module and also coupled to the lock mechanism to automatically actuate the lock mechanism if a fail signal is received, the modules cooperating to establish an interlock between fail detection and component locking.

21. The system of claim 20, wherein the component includes a housing defining at least one opening, the system device includes at least one component bay configured for receiving the component therein, and the component is movable to an operate position in the bay, wherein the component can be accessed by other parts of the system.

22. The system of claim 21, wherein the lock mechanism includes at least one lock associated with the bay and movable between a lock position, wherein the lock engages the housing to hold the component in the bay, and a release position, wherein the lock is distanced from the housing and the component can be moved from the operate position, the lock being automatically moved to the release position at least in response to the fail signal.

23. The system of claim 22, wherein the lock is biased toward the lock position.

24. The system of claim 22, further comprising a mechanical release coupled to the lock to move the lock to the release position regardless of whether a fail signal is present.

25. The system of claim 20, wherein the lock mechanism includes at least one bolt pivotably mounted relative to the hot pluggable component and at least one motor coupled to the bolt to move the bolt.

\* \* \* \* \*